US008855651B2

(12) United States Patent
Kondo

(10) Patent No.: US 8,855,651 B2
(45) Date of Patent: Oct. 7, 2014

(54) BASE STATION, GATEWAY, MOBILE COMMUNICATION SYSTEM, AND HANDOVER TARGET SPECIFYING METHOD AND PROGRAM USED THEREFOR

(75) Inventor: Takayuki Kondo, Tokyo (JP)

(73) Assignee: NEC Corporation, Tokyo (JP)

( * ) Notice: Subject to any disclaimer, the term of this patent is extended or adjusted under 35 U.S.C. 154(b) by 73 days.

(21) Appl. No.: 13/500,539

(22) PCT Filed: Aug. 6, 2010

(86) PCT No.: PCT/JP2010/004976
§ 371 (c)(1),
(2), (4) Date: Apr. 5, 2012

(87) PCT Pub. No.: WO2011/043015
PCT Pub. Date: Apr. 14, 2011

(65) Prior Publication Data
US 2012/0202505 A1   Aug. 9, 2012

(30) Foreign Application Priority Data
Oct. 7, 2009   (JP) ................... 2009-233190

(51) Int. Cl.
*H04W 36/32* (2009.01)
*H04W 36/08* (2009.01)
*H04W 56/00* (2009.01)
*H04W 84/04* (2009.01)
(52) U.S. Cl.
CPC ............ *H04W 36/08* (2013.01); *H04W 56/001* (2013.01); *H04W 84/045* (2013.01)
USPC .......................................... 455/440; 455/336
(58) Field of Classification Search
USPC ................... 455/436–439, 440; 370/331–332
See application file for complete search history.

(56) References Cited

U.S. PATENT DOCUMENTS

| 6,650,686 | B1 * | 11/2003 | Kondo | 375/130 |
|---|---|---|---|---|
| 7,450,545 | B2 * | 11/2008 | Kim et al. | 370/331 |
| 8,223,724 | B2 * | 7/2012 | Hakuli et al. | 370/335 |
| 8,380,196 | B2 * | 2/2013 | Racz et al. | 455/436 |
| 2006/0270406 | A1 * | 11/2006 | Kim | 455/436 |
| 2010/0329189 | A1 * | 12/2010 | Tsuboi et al. | 370/328 |

FOREIGN PATENT DOCUMENTS

| EP | 1 983 786 A1 | 10/2008 |
|---|---|---|
| GB | 2 446 192 A | 8/2008 |

OTHER PUBLICATIONS

QUALCOMM Europe, Considerations on Enabling Active Hand-In for Legacy UEs, 3GPP TSG RAN WG3, R3-090842, Mar. 2009, 4 pages.
QUALCOMM Europe, UE Behaiour for Intra-Frequency Active Hand-In to HNBs, 3GPP TSG RAN WG2, R3-092177, Mar. 2009, 2 pages.
Keiji Tachikawa, W-CDMA Mobile Communications System, Jun. 25, 2001, pp. 98-101.

\* cited by examiner

*Primary Examiner* — Cong Tran
(74) *Attorney, Agent, or Firm* — Foley & Lardner LLP

(57) ABSTRACT

In order to specify a handover target of a mobile station regardless of allocation of PSCs, each of femto base stations (10_1-10_3) forming a mobile communication system (1) stores phase differences between one timing for each base station to start generation of SFN and timings for other base stations to respectively start generation of SFN. The phase differences differ from each other. Each base station adds SFN, the generation of which is started at the one timing, to each broadcast information (101_1-101_3) to be wirelessly transmitted. One femto base station (10_1), on which a mobile station (20) camps, specifies as a handover target of the mobile station (20) a femto base station (10_2) starting generation of SFN with a phase difference equivalent to a difference between one SFN1 added to the broadcast information (101_1) and another SFN2 received at the mobile station (20) with respect to the base station itself.

16 Claims, 15 Drawing Sheets

100a

| SOURCE BASE STATION OF SFN DIFFERENCE | NEIGHBORING BASE STATION | SFN PHASE DIFFERENCE (×TTI) |
|---|---|---|
| 10_1 | 10_2 | +10 |
| | 10_3 | +20 |
| 10_2 | 10_1 | -10 |
| | 10_3 | +10 |
| 10_3 | 10_1 | -20 |
| | 10_2 | -10 |

Fig. 12

BASE STATION, GATEWAY, MOBILE COMMUNICATION SYSTEM, AND HANDOVER TARGET SPECIFYING METHOD AND PROGRAM USED THEREFOR

This application is the National Phase of PCT/JP2010/004976, filed Aug. 6, 2010, which claims priority to Japanese Application No. 2009-233190, filed Oct. 7, 2009, the disclosures of which are hereby incorporated by reference in their entirety.

TECHNICAL FIELD

The present invention relates to a base station, a gateway, a mobile communication system, and handover target specifying method and program used therefor, and particularly to a technique to specify a femto base station serving as a handover target of a mobile station.

BACKGROUND ART

Recently, development of radio base stations which can be placed indoors has been advanced. A cell formed by such a radio base station is generally called a femto cell since its cover area is extremely narrower than that of a radio base station placed outdoors. In the subsequent description, the radio base station forming the femto cell is referred to as a femto base station. By contrast, a radio base station forming a cell (generally called a macro cell) larger than the femto cell is referred to as a macro base station in some cases for differentiation from the femto base station.

Hereinafter, a structure and an operation of a typical mobile communication system where the femto base station is applied and communication is conducted in accordance with W-CDMA (Wideband Code Division Multiple Access) method will be described with reference to FIGS. 15 and 16.

As shown in FIG. 15, a mobile communication system $1z$ includes three units of femto base stations $10z\_1$ to $10z\_3$ which are placed adjacent to each other, and a mobile station $20z$ which selectively and wirelessly connects to these femto base stations $10z\_1$ to $10z\_3$.

The femto base stations $10z\_1$ to $10z\_3$ are connected by LAN (Local Area Network) or the like so as to be able to mutually communicate. Further, each of the femto base stations $10z\_1$ to $10z\_3$ operates a femto cell in accordance with a configuration from a maintenance device $2z$. Note that the maintenance device is a typical user terminal such as a PC (Personal Computer).

In the operation, as shown in FIG. 16, the maintenance device $2z$ firstly allocates different PSCs (Primary Scrambling Codes) to the respective femto cells in accordance with user operations, and makes a cell configuration list 200 which indicates the status of allocation of the PSCs (Step S101). As shown in FIG. 15, the allocation of PSC="C1" to the femto base station $10z\_1$, the allocation of PSC="C2" to the femto base station $10z\_2$ and the allocation of PSC="C3" to the femto base station $10z\_3$ are registered on the cell configuration list 200. In this case, the maintenance device $2z$ instructs the femto base station $10z\_1$ to use the PSC="C1" (Step S102_1), instructs the femto base station $10z\_2$ to use the PSC="C2" (Step S102_2), and instructs the femto base station $10z\_3$ to use the PSC="C3" (Step S102_3).

Next, the maintenance device $2z$ extracts neighboring femto cells of the respective femto base stations $10z\_1$ to $10z\_3$ from the cell configuration list 200, and makes neighboring cell configuration lists 201_1 to 201_3 which indicate the status of allocation of the PSCs in the extracted neighboring femto cells (Step S103). As shown in FIG. 15, the allocation of PSCs="C2" and "C3" respectively to the femto base stations $10z\_2$ and $10z\_3$ is registered on the neighboring cell configuration list 201_1. Further, although illustration is omitted, the allocation of PSCs="C1" and "C3" respectively to the femto base stations $10z\_1$ and $10z\_3$ is registered on the neighboring cell configuration list 201_2, and the allocation of PSCs="C1" and "C2" respectively to the femto base stations $10z\_1$ and $10z\_2$ is registered on the neighboring cell configuration list 201_3. Then, the maintenance device $2z$ notifies the femto base station $10z\_1$ of the neighboring cell configuration list 201_1 (Step S104_1), notifies the femto base station $10z\_2$ of the neighboring cell configuration list 201_2 (Step S104_2), and notifies the femto base station $10z\_3$ of the neighboring cell configuration list 201_3 (Step S104_3).

On the other hand, the femto base stations $10z\_1$ to $10z\_3$ respectively use the PSCs="C1" to "C3" instructed by the maintenance device $2z$ to wirelessly transmit broadcast information.

Assume that the mobile station $20z$ is located within the femto cell formed by the femto base station $10z\_1$. In this case, the mobile station $20z$ receives the broadcast information transmitted from the femto base station $10z\_1$, thereby wirelessly connecting to the femto base station $10z\_1$ (Step S105). Thus, the femto base station $10z\_1$ and the mobile station $20z$ are in communication with each other (Step S106).

After that, when the mobile station $20z$ moves to approach the femto base station $10z2$ as shown in FIG. 15, the mobile station $20z$ detects PSC of a neighboring femto cell (hereinafter, referred to as neighboring cell PSC) 203="C2" as a result of neighboring cell search (Step S107). At this time, the mobile station $20z$ notifies the neighboring cell PSC 203="C2" to the serving femto base station $10z\_1$ (Step S108).

The femto base station $10z\_1$ refers to the neighboring cell configuration list 201_1, thereby specifying the femto base station $10z\_2$ to which the same PSC="C2" as the neighboring cell PSC 203 is allocated as a handover target of the mobile station $20z$ (Step S109). At this time, the femto base station $10z\_1$ requests the femto base station $10z\_2$ to accept a handover of the mobile station $20z$ (Step S110). Further, the femto base station $10z\_1$ requests the mobile station $20z$ to perform the handover to the femto base station $10z\_2$ (Step S111). Thus, the femto base station $10z\_2$ and the mobile station $20z$ are in communication with each other (Step S112).

Note that NPL 1, for example, discloses the above-mentioned method of specifying the handover target cell (base station) based on the PSC.

CITATION LIST

Non Patent Literature

NPL 1: Keiji TACHIKAWA, "W-CDMA Mobile Communications System", published on Jun. 25, 2001, pp. 98-101

SUMMARY OF INVENTION

Technical Problem

However, in the typical mobile communication system, there is a problem that the handover target of the mobile station may not be uniquely specified. Upon the operation of femto cells, a limited number of (about two or three) PSCs are generally allocated. Therefore, in the typical mobile communication system, the handover target cell cannot be specified in a case where there exist a plurality of neighboring femto cells using the same PSC.

Accordingly, an exemplary object of the present invention is to provide a base station, a gateway, a mobile communication system, and handover target specifying method and program used therefore, which can specify a handover target of a mobile station regardless of allocation of PSCs.

Solution to Problem

In order to achieve the above-mentioned object, a base station according to a first exemplary aspect of the present invention includes a storing means for storing phase differences between one timing for the base station itself to start generation of SFN (System Frame Number) and timings for a plurality of neighboring base stations to respectively start generation of SFN, the phase differences differing from each other; a transmitting means for adding SFN, the generation of which is started at the one timing, to broadcast information and wirelessly transmitting the broadcast information; and a specifying means for specifying, as a handover target of a mobile station camping on the base station itself, a neighboring base station starting generation of SFN with a phase difference equivalent to a first difference between one SFN added to the broadcast information and another SFN received at the mobile station with respect to the base station itself.

Further, a gateway according to a second exemplary aspect of the present invention includes a relaying means for relaying communication between N units (N is an integer equal to or more than three) of base stations placed adjacent to each other; a storing means for storing phase differences between timings for the N units of base stations to respectively start generation of SFN, the phase differences differing from each other; and a specifying means for receiving from one base station a difference between SFN added by the one base station to broadcast information and SFN that is received at a mobile station camping on the one base station and added by another base station to broadcast information, and for specifying as a handover target of the mobile station a base station starting generation of SFN with a phase difference equivalent to the difference with respect to the one base station.

Further, a mobile communication system according to a third exemplary aspect of the present invention includes N units of base stations placed adjacent to each other, and a mobile station that selectively camps on the N units of base stations. Each of the base stations stores phase differences between one timing for each of the base stations to start generation of SFN and timings for other base stations to respectively start generation of SFN, the phase differences differing from each other, and adds SFN, the generation of which is started at the one timing, to broadcast information to be wirelessly transmitted. One base station on which the mobile station camps specifies, as a handover target of the mobile station, a base station starting generation of SFN with a phase difference equivalent to a difference between one SFN added to the broadcast information and another SFN received at the mobile station with respect to the one base station itself.

Further, a mobile communication system according to a fourth exemplary aspect of the present invention includes N units of base stations placed adjacent to each other; a mobile station that selectively camps on the N units of base stations; and a gateway that relays communication between the N units of base stations. The gateway is configured to store phase differences between timings for the N units of base stations to respectively start generation of SFN, the phase differences differing from each other, receive, from one base station on which the mobile station camps, a difference between SFN added by the one base station to broadcast information and SFN that is received at the mobile station and added by another base station to broadcast information, and specify, as a handover target of the mobile station, a base station starting generation of SFN with a phase difference equivalent to the difference with respect to the one base station.

Further, a handover target specifying method according to a fifth exemplary aspect of the present invention provides a handover target specifying method used for a base station. This handover target specifying method includes storing phase differences between one timing for the base station to start generation of SFN and timings for a plurality of neighboring base stations to respectively start generation of SFN, the phase differences differing from each other; adding SFN, the generation of which is started at the one timing, to broadcast information to be wirelessly transmitted; and specifying, as a handover target of a mobile station camping on the base station, a neighboring base station starting generation of SFN with a phase difference equivalent to a first difference between one SFN added to the broadcast information and another SFN received at the mobile station with respect to the base station.

Further, a handover target specifying method according to a sixth exemplary aspect of the present invention provides a handover target specifying method used for a gateway. This handover target specifying method includes relaying communication between N units of base stations placed adjacent to each other; storing phase differences between timings for the N units of base stations to respectively start generation of SFN, the phase differences differing from each other; receiving from one base station a difference between SFN added by the one base station to broadcast information and SFN that is received at a mobile station camping on the one base station and added by another base station to broadcast information; and specifying, as a handover target of the mobile station, a base station starting generation of SFN with a phase difference equivalent to the difference with respect to the one base station.

Further, a handover target specifying program according to a seventh exemplary aspect of the present invention causes a base station to execute a process to store phase differences between one timing for the base station to start generation of SFN (System Frame Number) and timings for a plurality of neighboring base stations to respectively start generation of SFN, the phase differences differing from each other; a process to add SFN, the generation of which is started at the one timing, to broadcast information to be wirelessly transmitted; and a process to specify, as a handover target of a mobile station camping on the base station, a neighboring base station starting generation of SFN with a phase difference equivalent to a first difference between one SFN added to the broadcast information and another SFN received at the mobile station with respect to the base station.

Furthermore, a handover target specifying program according to an eighth exemplary aspect of the present invention causes a gateway to execute a process to relay communication between N units (N is an integer equal to or more than three) of base stations placed adjacent to each other; a process to store phase differences between timings for the N units of base stations to respectively start generation of SFN (System Frame Number), the phase differences differing from each other; a process to receive from one base station a difference between SFN added by the one base station to broadcast information and SFN that is received at a mobile station camping on the one base station and added by another base station to broadcast information; and a process to specify, as a handover target of the mobile station, a base station starting generation of SFN with a phase difference equivalent to the difference with respect to the one base station.

Advantageous Effects of Invention

According to the present invention, it is possible to specify a handover target of a mobile station regardless of allocation of PSCs.

BRIEF DESCRIPTION OF DRAWINGS

FIG. 12 is a diagram showing an example of a cell configuration list used for the mobile communication system according to the third exemplary embodiment of the present invention.

DESCRIPTION OF EMBODIMENTS

Figure 1:
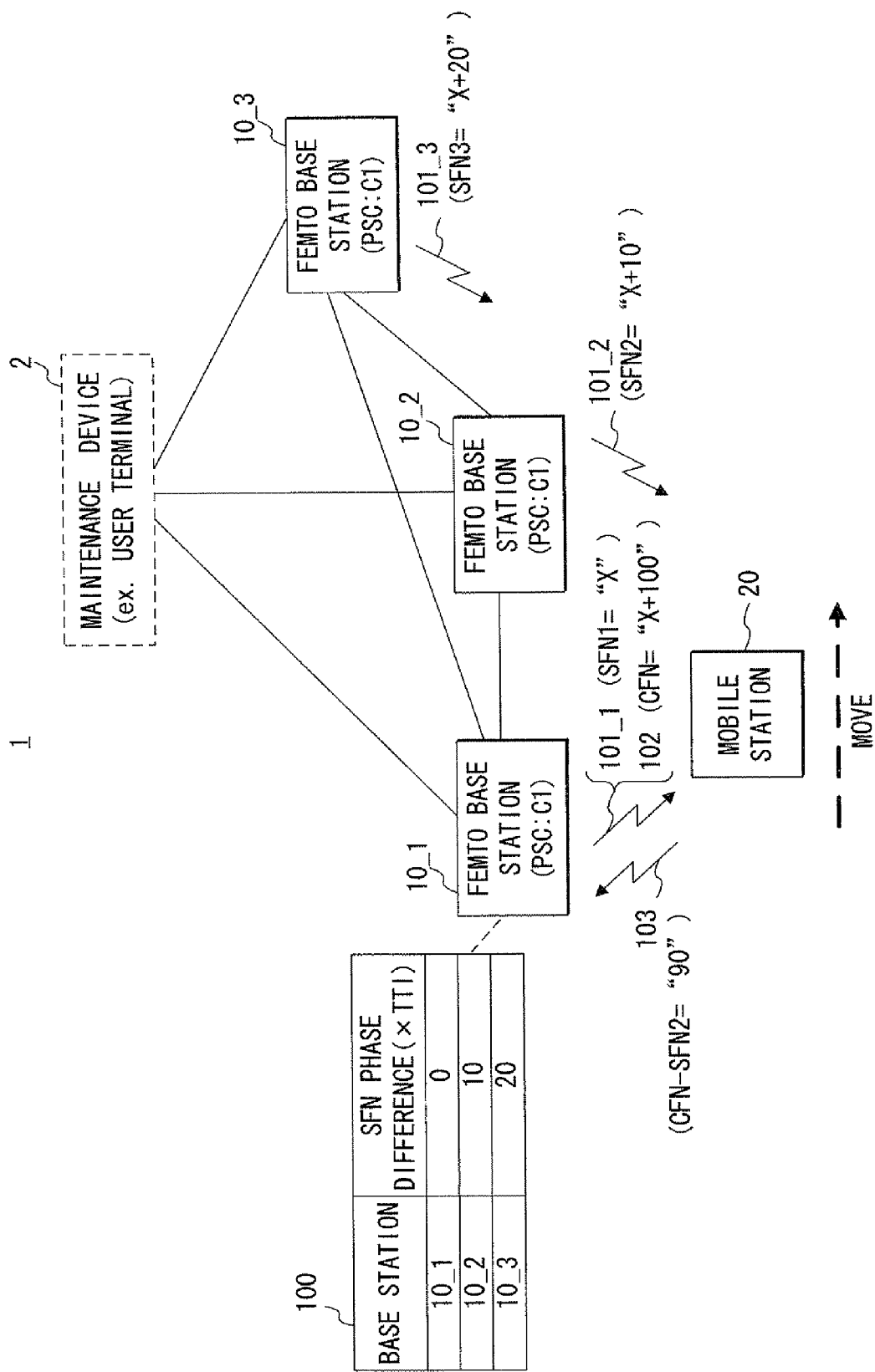
FIG. 1 is a block diagram showing an example of a structure of a mobile communication system according to a first exemplary embodiment of the present invention.

Hereinafter, first to fourth exemplary embodiments of a mobile communication system according to the present invention will be described with reference to FIGS. 1 to 14.

Note that in the drawings, the identical reference symbols denote identical elements and the redundant explanation thereof will be omitted as appropriate to clarify the explanation.

[First Exemplary Embodiment]

As shown in FIG. 1, a mobile communication system 1 according to this exemplary embodiment includes e.g., three units of femto base stations 10_1 to 10_3 (hereinafter, sometimes collectively denoted by the symbol 10) which are placed adjacent to each other, and a mobile station 20 which selectively and wirelessly connects to these femto base stations 10_1 to 10_3.

The femto base stations 10_1 to 10_3 are connected by LAN or the like so as to be able to mutually communicate. Further, each of the femto base stations 10_1 to 10_3 operates a femto cell in accordance with configuration from a maintenance device 2. In the illustrated example, the same PSC="C1" is allocated to each of the femto base stations 10_1 to 10_3. Note that as the maintenance device 2, a user terminal such as a PC can be used, for example.

In the operation, each of the femto base stations 10_1 to 10_3 firstly stores a cell configuration list 100 notified from the maintenance device 2. On the cell configuration list 100, mutually different phase differences (hereinafter, referred as to SFN phase differences) between timings for the femto base stations 10_1 to 10_3 to respectively start generation of SFN are registered. In the illustrated example, the cell configuration list 100 indicates that the femto base station 10_2 should start generation of SFN2 at a timing delayed by "10 TTIs (Transmission Time Intervals)" from a timing for starting generation of SFN1 in the femto base station 10_1, and that the femto base station 10_3 should start generation of SFN at a timing delayed by "20 TTIs" from the timing for starting the generation of SFN1.

Then, the femto base station 10_1 adds SFN1, the generation of which is started in accordance with contents registered on the cell configuration list 100 at a predetermined reference timing in the mobile communication system 1, to broadcast information 101_1 to be wirelessly transmitted. Similarly, the femto base station 10_2 adds SFN2, the generation of which is started at the timing delayed by "10 TTIs" from the reference timing, to broadcast information 101_2 to be wirelessly transmitted. The femto base station 10_3 adds SFN3, the generation of which is started at the timing delayed by "20 TTIs" from the reference timing, to broadcast information 101_3 to be wirelessly transmitted. Each of the SFN1 to SFN3 is incremented by "1" for each TTI. In other words, if a value of the SFN1 at a given time is defined as "X" (X is an integer equal to or more than 0), it is satisfied that the SFN2="X+10" and the SFN3="X+20". Note that in the subsequent description, the broadcast information 101_1 to 101_3 are sometimes collectively denoted by the symbol 101.

Assume that the mobile station 20 is in communication with the femto base station 10_1. In this case, the mobile station 20 receives from the femto base station 10_1 data 10_2 to which CFN (Connection Frame Number) is added. As a matter of convenience for the subsequent description, assume that the CFN="X+100" (SFN1+100) is satisfied.

After that, when the mobile station 20 moves to approach the femto base station 10_2 as shown in FIG. 1, the mobile station 20 detects the presence of the femto base station 10_2 as a result of neighboring cell search and receives the broadcast information 101_2. At this time, the mobile station 20 notifies the femto base station 10_1 of a difference (hereinafter, referred as to CFN-SFN difference) 103="90" between the CFN and the SFN2 added to the broadcast information 101_2.

The femto base station 10_1 calculates a difference (hereinafter, referred as to SFN difference) between the SFN2 and the SFN1 by use of the CFN-SFN difference 103 ("CFN-SFN2"), the CFN and the SFN1 in accordance with the following expression (1).

$$\begin{aligned} SFN \text{ difference} &= SFN2 - SFN1 \\ &= (CFN - SFN1) - (CFN - SFN2) \\ &= \text{``100''} - \text{``90''} \\ &= \text{``10''} \end{aligned} \quad (1)$$

Then, the femto base station 10_1 refers to the cell configuration list 110, and thus specifies as a handover target of the mobile station 20 the femto base station 10_2 starting generation of SFN with the SFN phase difference "10 TTIs" equivalent to the SFN difference="10" calculated by the above-mentioned expression (1). Note that a certain margin of error may be tolerated for the calculated value of the SFN difference.

Thus, in this exemplary embodiment, it is possible to uniquely specify the handover target cell even when there exist a plurality of neighboring femto cells using the same PSC. Note that although the illustration is omitted, the above-mentioned cell configuration list 100 may be stored in a macro base station. In this case, even when there exist a plurality of femto cells using the same PSC upon a handover from a macro cell to a femto cell, the macro base station can uniquely specify the femto cell as the handover target.

Further, the notification itself of the above-mentioned CFN-SFN difference 103 is also performed in the typical mobile station. Therefore, there is the advantage that the existing mobile station can be used. Note that the mobile station 20 may notify the femto base station 10 of the above-mentioned SFN difference as a substitute for the CFN-SFN difference 103. In this case, processing load on the femto base station 10 can be reduced.

Hereinafter, specific examples of a structure and an operation of the femto base station 10 will be described in detail with reference to FIGS. 2 to 6.

Figure 2:
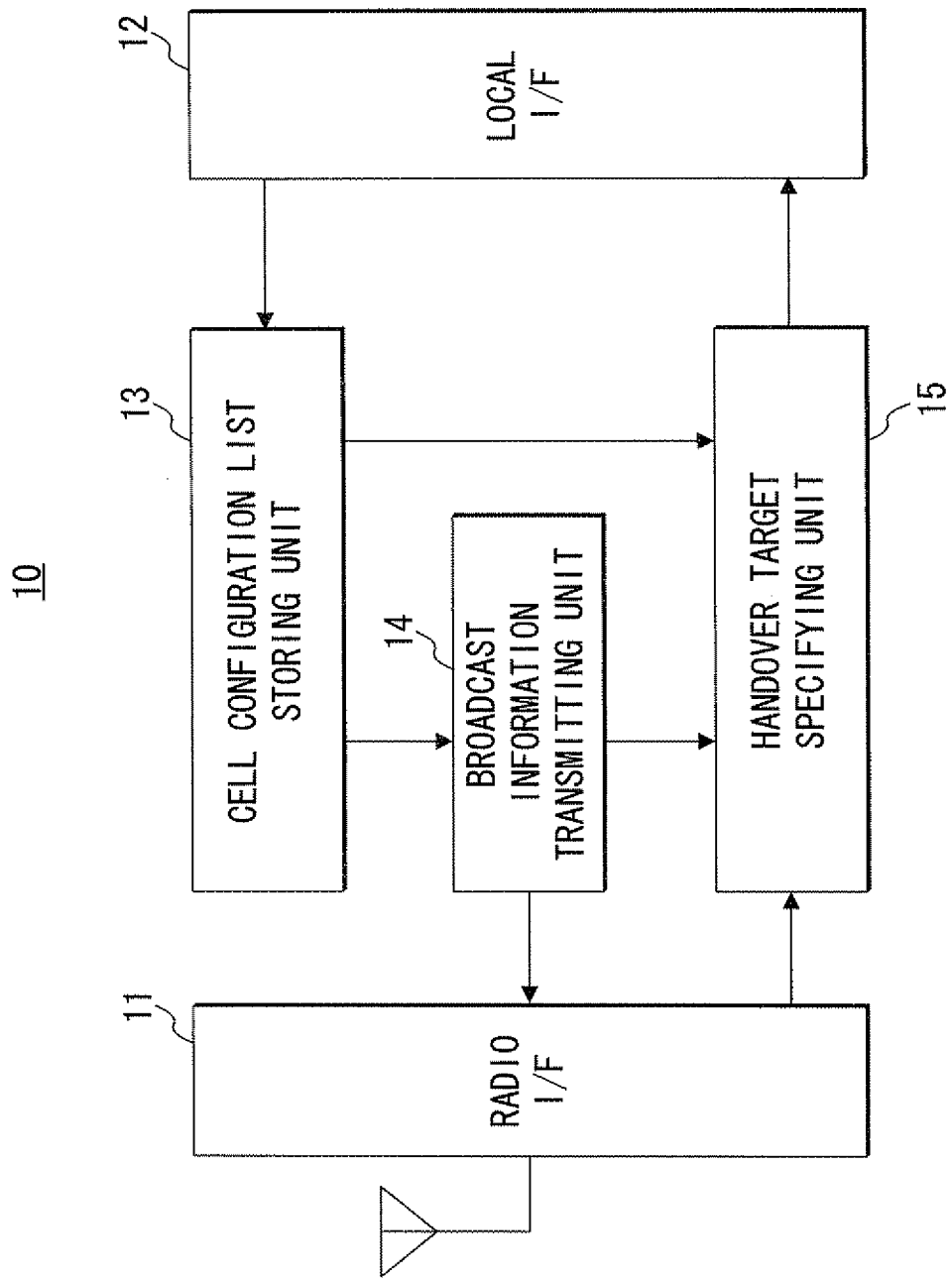
FIG. 2 is a block diagram showing an example of a structure of a base station according to the first exemplary embodiment of the present invention.

As shown in FIG. 2, the femto base station 10 includes a radio I/F 11 which transmits and receives radio signals to and from the mobile station 20, a local I/F 12 which operates as a interface to the neighboring femto base station and the maintenance device 2, a cell configuration list storing unit 13, a broadcast information transmitting unit 14, and a handover target specifying unit 15. Note that the explanation of structural elements which does not relate to the specification of the handover target is omitted.

Among them, the cell configuration list storing unit 13 stores the cell configuration list 100 notified from the maintenance device 2 through the local I/F 12 in storage media such as a memory.

The broadcast information transmitting unit 14 starts generation of SFN at a timing in accordance with contents registered on the cell configuration list 100, and increments the SFN by "1" for each TTI. The broadcast information transmitting unit 14 causes the radio I/F 11 to wirelessly transmit the broadcast information 101 to which the SFN is added. At this time, the broadcast information transmitting unit 14 notifies the SFN to the handover target specifying unit 15.

The handover target specifying unit 15 receives the CFN-SFN difference 103 through the radio I/F 11 from the mobile station 20 camping on the base station 10. At this time, the handover target specifying unit 15 calculates the SFN difference by use of the CFN-SFN difference 103, the CFN, and the SFN notified from the broadcast information transmitting unit 14 in accordance with the above-mentioned expression (1). Alternatively, the handover target specifying unit 15 receives the SFN difference through the radio I/F 11 from the mobile station 20. Then, the handover target specifying unit 15 refers to the cell configuration list 100, and thus specifies as the handover target of the mobile station 20 a neighboring femto base station starting generation of SFN with the SFN phase difference equivalent to the SFN difference with respect to the base station 10 itself.

Next, a specific example of an operation of the femto base station 10 will be described in detail with reference to FIGS. 3 to 6.

Figure 3:
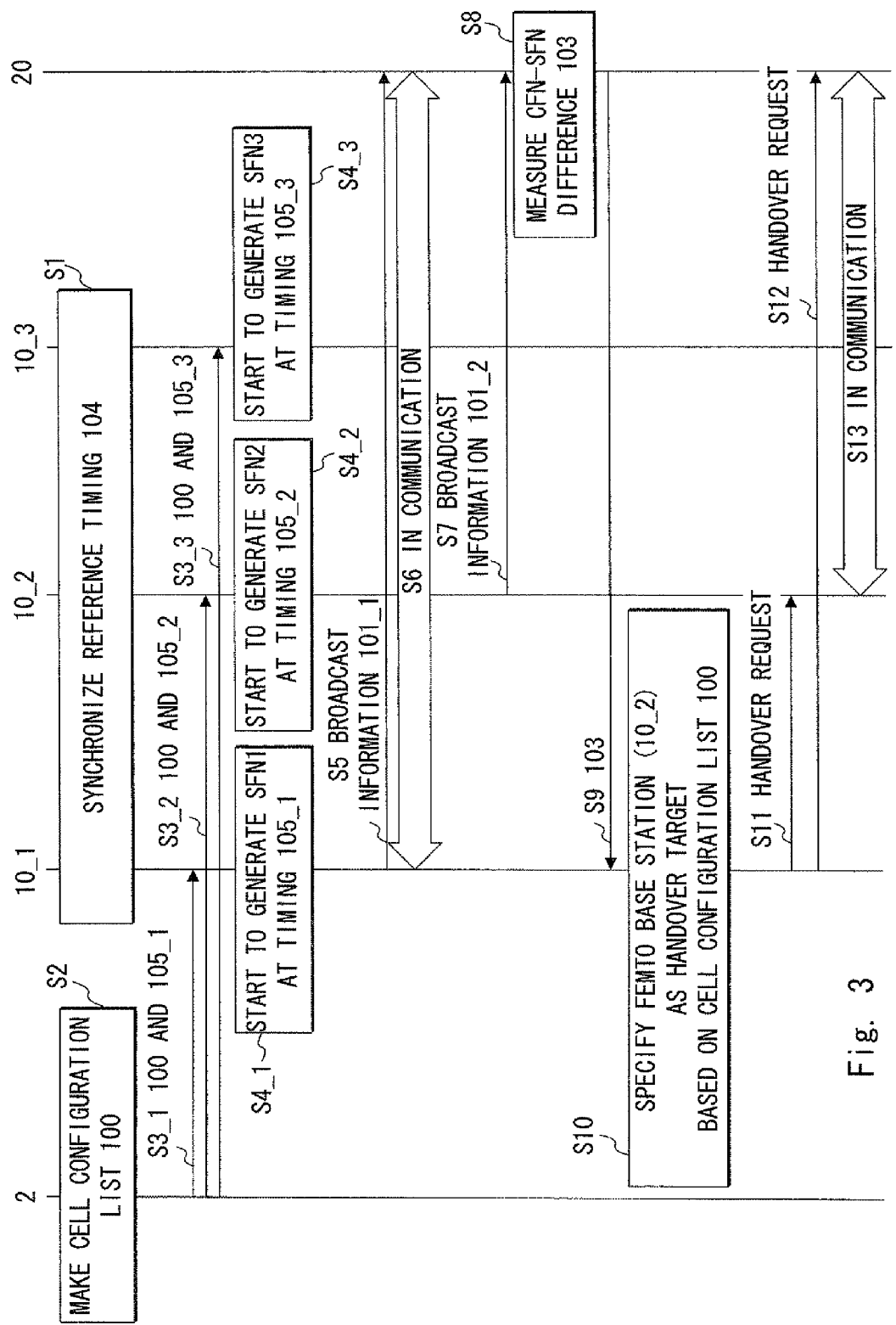
FIG. 3 is a sequence chart showing an example of an operation of the mobile communication system according to the first exemplary embodiment of the present invention.
Figure 4:
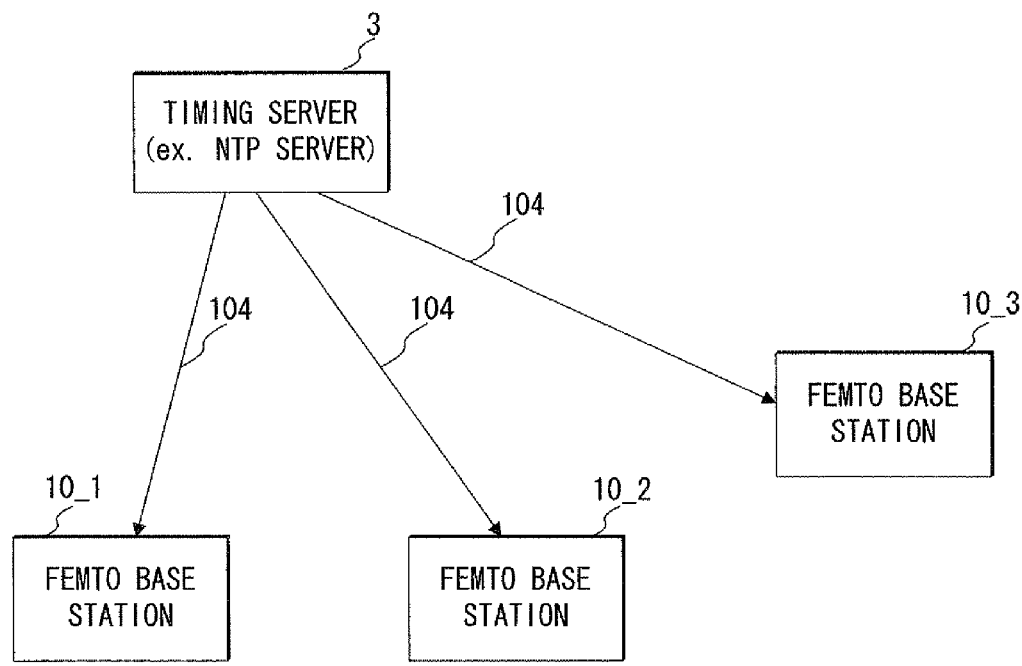
FIG. 4 is a block diagram showing one example of operations to acquire a reference timing in the base station according to the first exemplary embodiment of the present invention.
Figure 5:
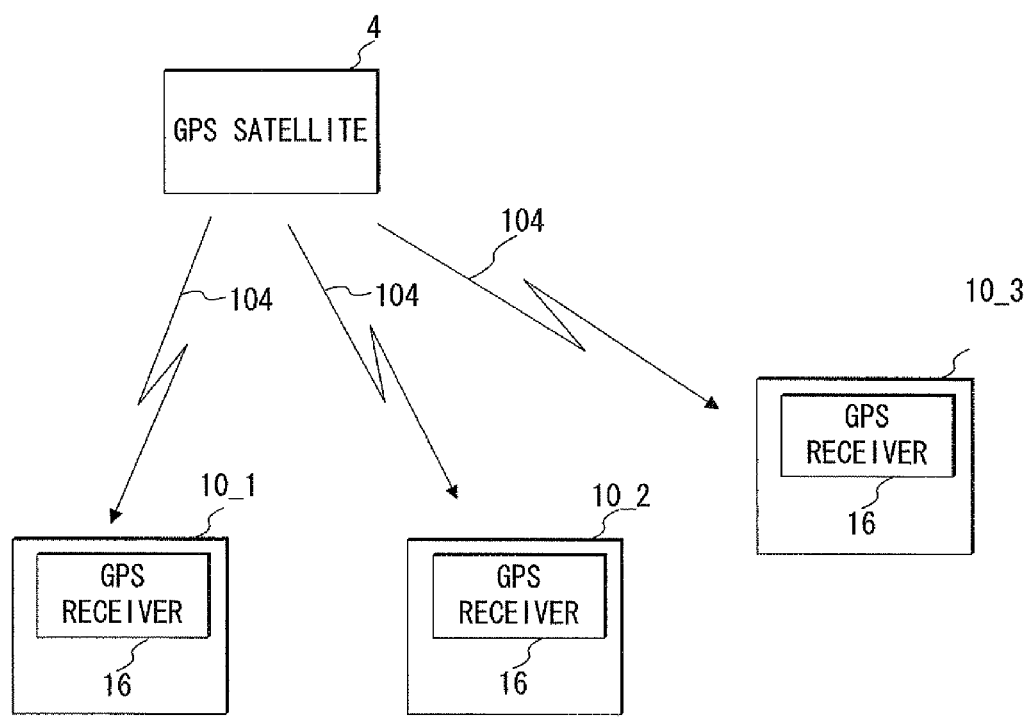
FIG. 5 is a block diagram showing another example of operations to acquire the reference timing in the base station according to the first exemplary embodiment of the present invention.

As shown in FIG. 3, the femto base stations 10_1 to 10_3 firstly synchronize reference timings 104 (Step S1). Specifically, the broadcast information transmitting unit 14 in each of the femto base stations 10_1 to 10_3 acquires the reference timing 104 from a timing server 3 such as a NTP (Network Time Protocol) server, which is connected in common to each of the femto base stations 10_1 to 10_3 as shown in FIG. 4. Alternatively, the broadcast information transmitting unit 14 controls a GPS (Global Positioning System) receiver 16 embedded in each of the femto base stations 10_1 to 10_3 as shown in FIG. 5, thereby acquiring the reference timing 104 from a GPS satellite 4.

In parallel with the above-mentioned Step S1, the maintenance device 2 makes the cell configuration list 100 shown in FIG. 1 in accordance with user's operations (Step S2). At this time, the maintenance device 2 notifies the femto base stations 10_1 to 10_3 of timings 105_1 to 105_3 for starting generation of SFN1 to SFN3 together with the cell configuration lists 100 (Steps S3_1 to S3_3). Note that in the subsequent description, the timings 105_1 to 105_3 for starting generation are sometimes collectively denoted by the symbol 105.

The cell configuration list storing unit 13 in each of the femto base stations 10_1 to 10_3 stores the notified cell configuration list 100. Further, the broadcast information transmitting unit 14 starts generation of SFN at the notified timing 105, and adds the SFN to the broadcast information 101 to be wirelessly transmitted (Steps S4_1 to S4_3).

Thus, SFN phase differences registered on the cell configuration list 100 are caused between the timings for starting generation of SFN1 to SFN3, so that there are established relations of the SFN1="X", the SFN2="X+10" and the SFN3="X+20" at a given time.

Assume that the mobile station 20 is located within the femto cell formed by the femto base station 10_1. In this case, the mobile station 20 receives the broadcast information 101_1 transmitted from the femto base station 10_1, thereby wirelessly connecting to the femto base station 10_1 (Step S5). Thus, the femto base station 10_1 and the mobile station 20 are in communication with each other (Step S6).

After that, when the mobile station 20 moves to approach the femto base station 10_2, the mobile station 20 detects the presence of the femto base station 10_2 as a result of neighboring cell search and receives the broadcast information 101_2 (Step S7). At this time, the mobile station 20 measures a CFN-SFN difference 103 between the CFN received from the femto base station 10_1 and the SFN2 added to the broadcast information 101_2 (Step S8). Then, the mobile station 20 notifies the measured CFN-SFN difference 103 to the femto base station 10_1 (Step S9).

The handover target specifying unit 15 in the femto base station 10_1 calculates a SFN difference between the SFN2 and the SFN1 by use of the CFN-SFN difference 103, the CFN, and the SFN1 notified from the broadcast information transmitting unit 14. Further, the handover target specifying unit 15 refers to the cell configuration list 100, and thus specifies as the handover target of the mobile station 20 the femto base station 10_2 starting generation of SFN with a SFN phase difference equivalent to the calculated SFN difference with respect to the femto base station 10_1 (Step S10).

At this time, the handover target specifying unit 15 requests the femto base station 10_2 through the local I/F 12 to accept a handover of the mobile station 20 (Step S11). Further, the handover target specifying unit 15 requests the mobile station 20 through the radio I/F 11 to perform the handover to the femto base station 10_2 (Step S12). Thus, the femto base station 10_2 and the mobile station 20 are in communication with each other (Step S13).

Figure 6:
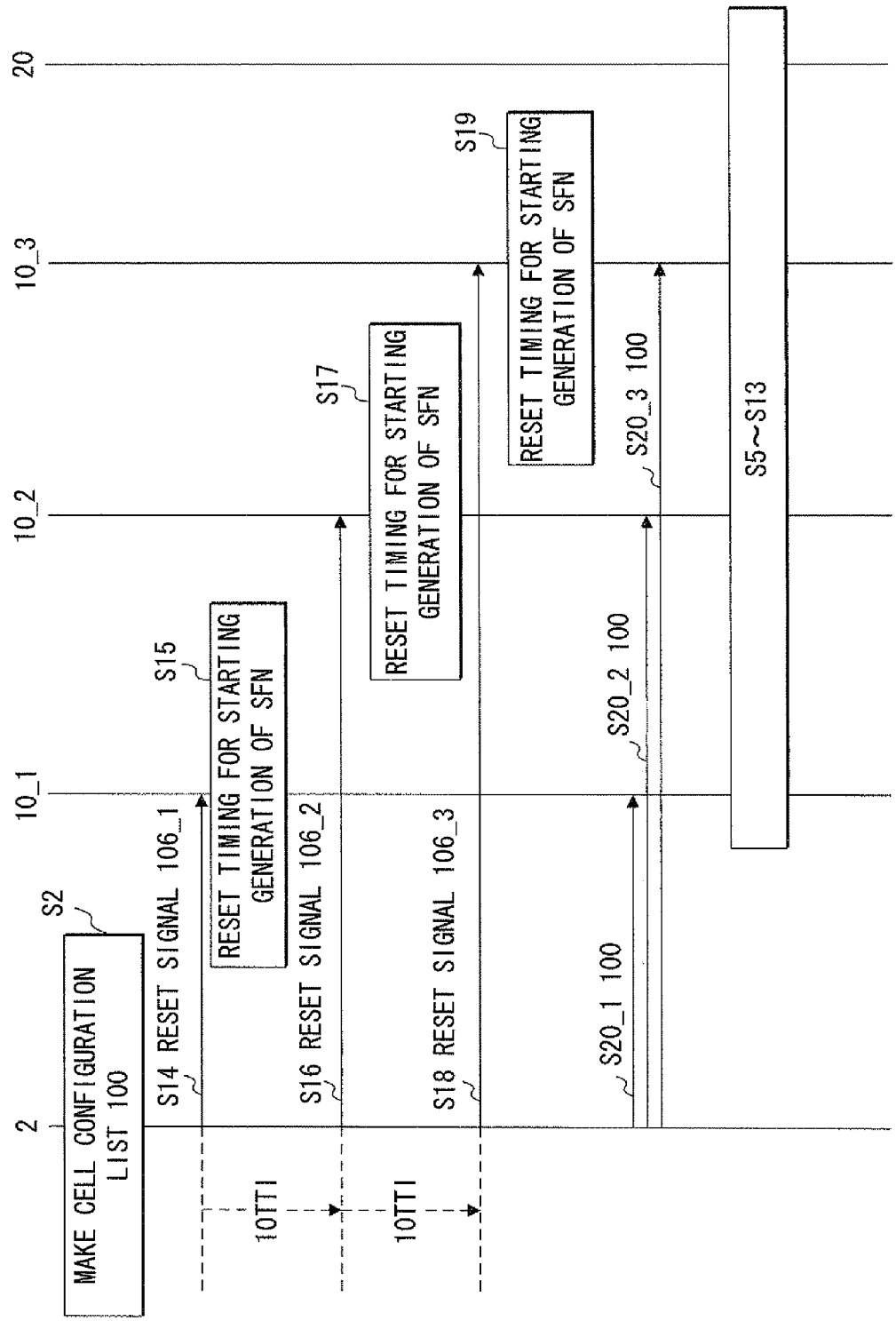
FIG. 6 is a sequence chart showing an example of an operation to set a timing for starting generation of SFN in the base station according to the first exemplary embodiment of the present invention.

Further, the SFN phase differences between the timings for starting generation of SFN1 to SFN3 can also be caused as shown in FIG. 6. In other words, the maintenance device 2 performs Steps S14, S16, S18 and S20_1 to S20_3 shown in FIG. 6, as substitutes for the above-mentioned Steps S3_1 to S3_3 shown in FIG. 3. On the other hand, the femto base stations 10_1 to 10_3 perform Steps S15, S17 and S19 shown in FIG. 6 respectively, as substitutes for the above-mentioned Steps S1 and S4_1 to S4_3 shown in FIG. 3.

More specifically, the maintenance device 2 makes the cell configuration list 100 at the above-mentioned Step S2, and then transmits a reset signal 106_1 to the femto base station 10_1 (Step S14). The broadcast information transmitting unit 14 in the femto base station 10_1 resets the timing for starting generation of SFN1 in response to receiving the reset signal 106_1 (Step S15).

After "10 TTIs" have elapsed since the time of transmission of the reset signal 106_1, the maintenance device 2 transmits a reset signal 106_2 to the femto base station 10_2 (Step S16). The broadcast information transmitting unit 14 in the femto base station 10_2 resets the timing for starting generation of SFN2 in response to receiving the reset signal 106_2 (Step S17).

After "10 TTIs" have further elapsed since the time of transmission of the reset signal 106_2, the maintenance device 2 transmits a reset signal 106_3 to the femto base station 10_3 (Step S18). The broadcast information transmitting unit 14 in the femto base station 10_3 resets the timing for starting generation of SFN3 in response to receiving the reset signal 106_3 (Step S19).

Then, the maintenance device 2 notifies the cell configuration lists 100 respectively to the femto base stations 10_1 to 10_3 (Steps S20_1 to S20_3). After that, the above-mentioned Steps S5 to S13 shown in FIG. 3 are performed in cooperation of the femto base stations 10_1 to 10_3 and the mobile station 20.

[Second Exemplary Embodiment]

Figure 7:
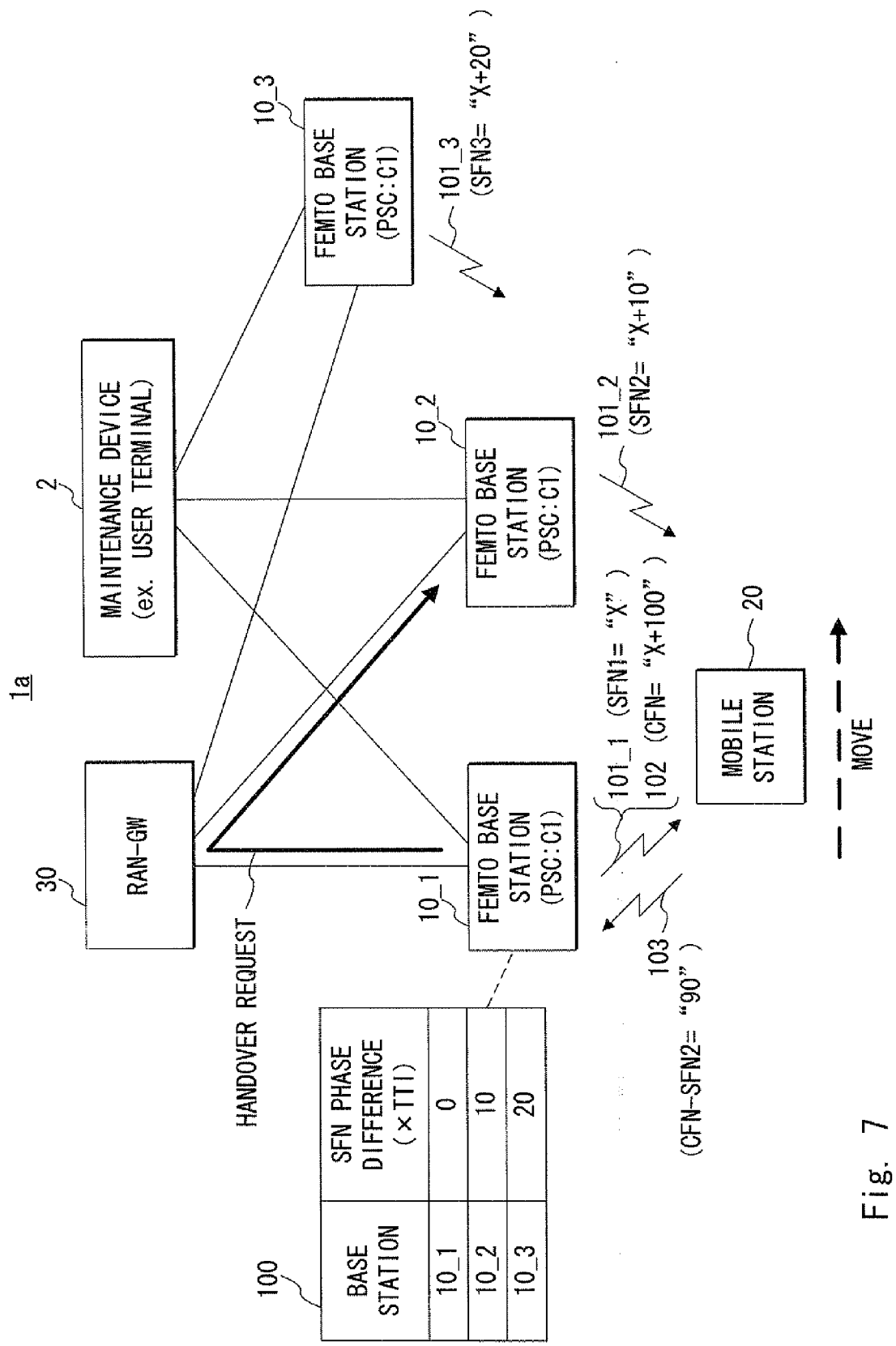
FIG. 7 is a block diagram showing an example of a structure of a mobile communication system according to a second exemplary embodiment of the present invention.

As shown in FIG. 7, a mobile communication system 1a according to this exemplary embodiment is different from the above-mentioned first exemplary embodiment (the mobile communication system 1 shown in FIG. 1), in that the mobile communication system 1a includes a RAN-GW (Radio Access Network Gateway) 30 which relays communication between the femto base stations 10_1 to 10_3.

Each of the femto base stations 10_1 to 10_3 is connected to the RAN-GW 30 through an IP (Internet Protocol) communication network, the Internet or the like by use of a communication line such as ADSL (Asymmetric Digital Subscriber Line) or an optical fiber. Further, the RAN-GW 30 also relays communication between each of the femto base stations 10_1 to 10_3 and a core network (not shown) operated by a telecommunication carrier.

As the operation particular to this exemplary embodiments, the RAN-GW 30 typically relays a handover request from a femto base station on which the mobile station 20 camps to a femto base station as a handover target. Specifically, each of the femto base stations 10_1 to 10_3 performs Step S21 shown in FIG. 8 as a substitute for the above-mentioned Step S11 shown in FIG. 3. On the other hand, the RAN-GW 30 performs Step S22 shown in FIG. 8.

Taking a handover from the femto base station 10_1 to the femto base station 10_2 as an example, the handover target specifying unit 15 in the femto base station 10_1 transmits to the RAN-GW 30 a handover request addressed to the femto base station 10_2 after the above-mentioned Step S10 (Step S21). The RAN-GW 30 transfers the received handover request to the femto base station 10_2 (Step S22).

In parallel with that, the handover target specifying unit 15 requests the mobile station 20 to perform a handover as with the above-mentioned Step S12. Thus, the femto base station 10_2 and the mobile station 20 are in communication with each other as with the above-mentioned Step S13.

[Third Exemplary Embodiment]

Figure 9:
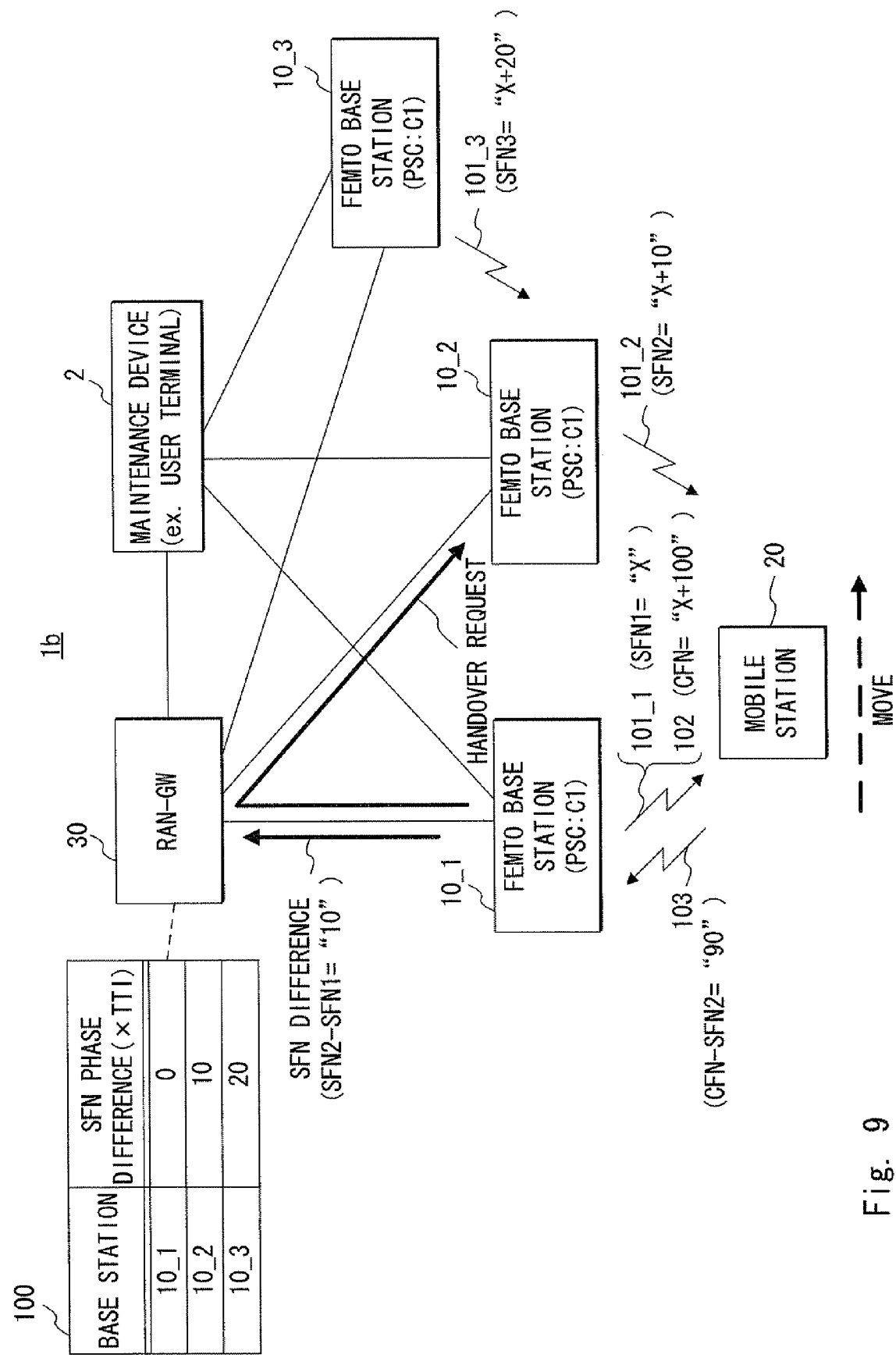
FIG. 9 is a block diagram showing an example of a structure of a mobile communication system according to a third exemplary embodiment of the present invention.

As shown in FIG. 9, a mobile communication system 1b according to this exemplary embodiment is different from the above-mentioned second exemplary embodiment (the mobile communication system 1a shown in FIG. 7), in that each of the femto base stations 10_1 to 10_3 transmits the SFN difference to the RAN-GW 30 and that the RAN-GW 30 refers to the cell configuration list 10 notified from the maintenance device 2 to specify the handover target cell of the mobile station 20. In other words, the RAN-GW 30 specifies the handover target cell on behalf of each of the femto base stations 10_1 to 10_3 in this exemplary embodiment.

Figure 10:
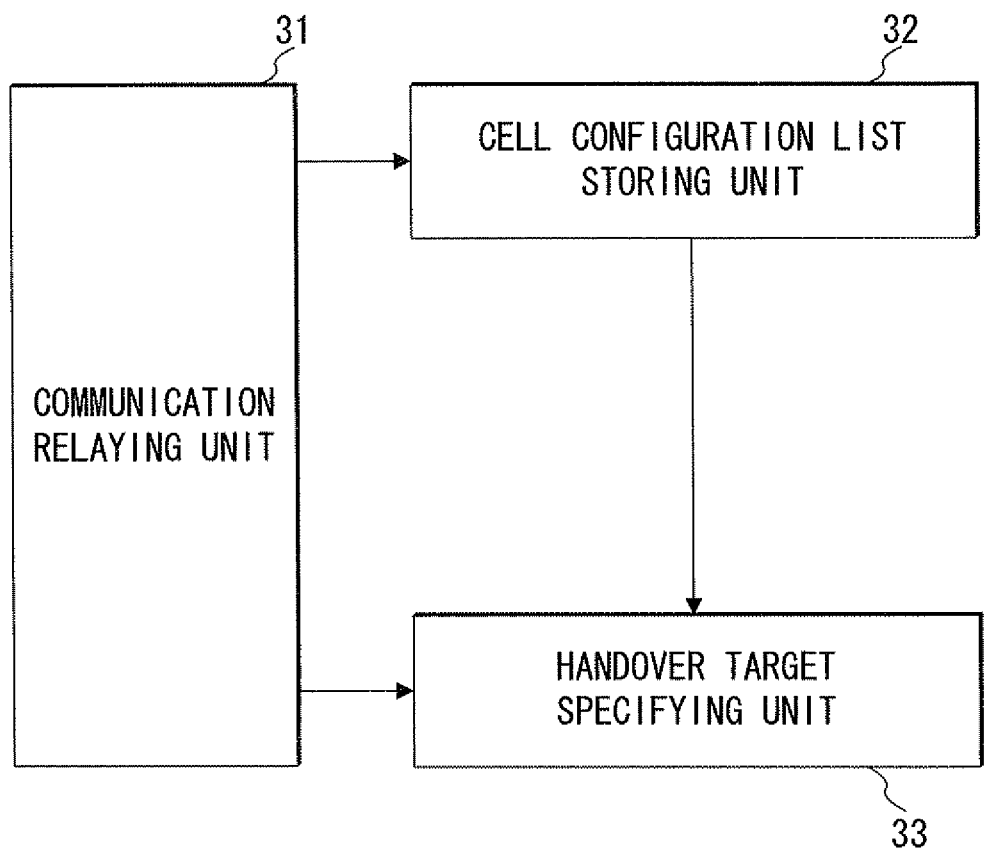
FIG. 10 is a block diagram showing an example of a structure of a gateway according to the third exemplary embodiment of the present invention.

Further, as shown in FIG. 10, the RAN-GW 30 includes a communication relaying unit 31, a cell configuration list storing unit 32, and a handover target specifying unit 33. Among them, the communication relaying unit 31 relays communication between the femto base stations 10_1 to 10_3, and communication between each of the femto base stations 10_1 to 10_3 and the core network. Further, the communication relaying unit 31 causes the cell configuration list storing unit 32 to store the cell configuration list 10 received from the maintenance device 2. On the other hand, the handover target specifying unit 33 receives the SFN difference from each of the femto base stations 10_1 to 10_3 through the communication relaying unit 31. At this time, the handover target specifying unit 33 refers to the cell configuration list 100, and thus specifies as the handover target of the mobile station 20 a neighboring femto base station starting generation of SFN with the SFN phase difference equivalent to the SFN difference with respect to the femto base station serving as the source of the SFN difference.

Next, a specific example of an operation of the mobile communication system 1b will be described in detail with reference to FIGS. 11 and 12.

Figure 11:
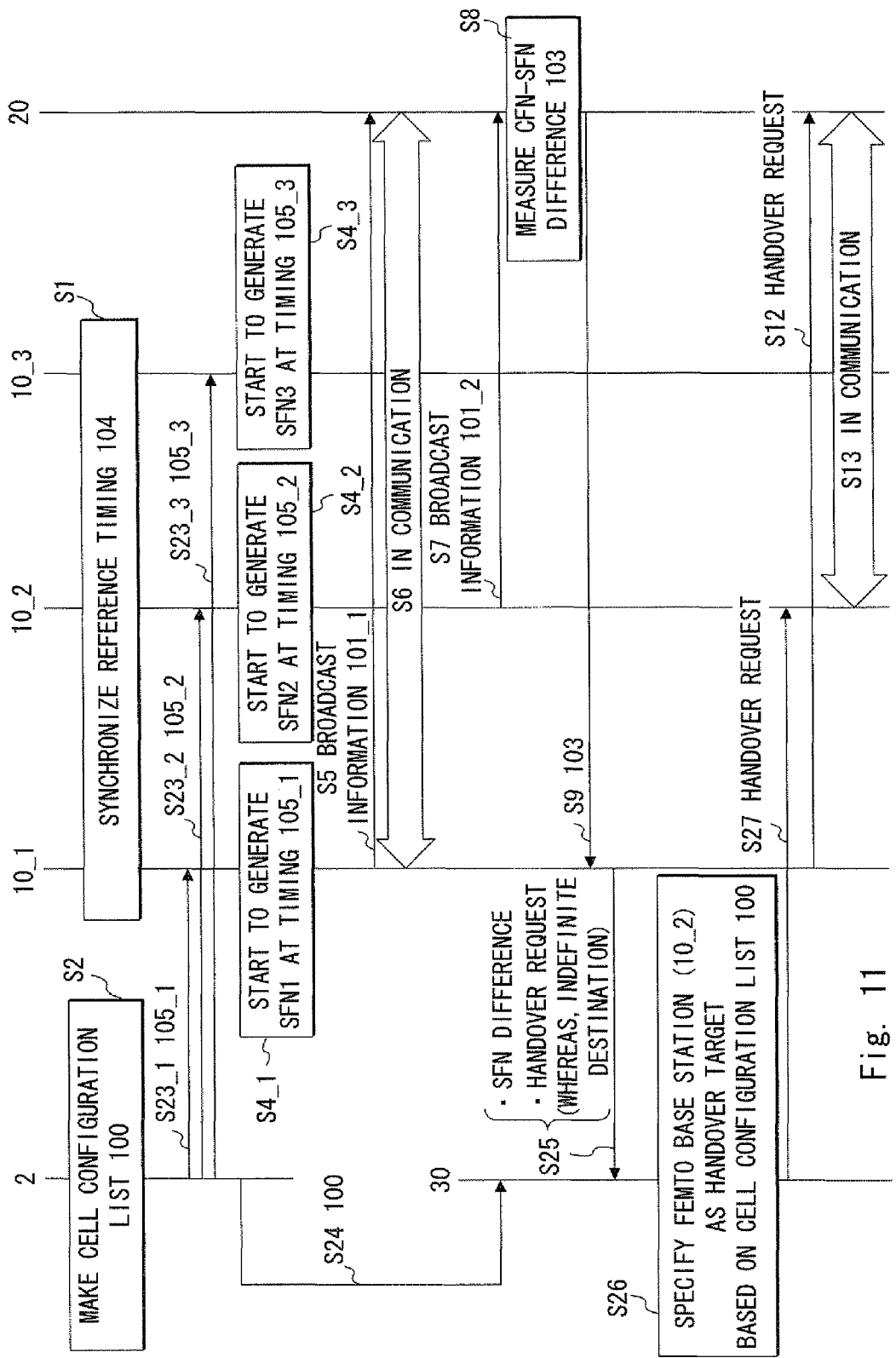
FIG. 11 is a sequence chart showing an example of an operation of the mobile communication system according to the third exemplary embodiment of the present invention.

As shown in FIG. 11, the femto base stations 10_1 to 10_3 firstly synchronize the reference timings 104 as with the above-mentioned Step S1 shown in FIG. 3. In parallel with that, the maintenance device 2 makes the cell configuration list 100 as with the above-mentioned Step S2.

At this time, the maintenance device 2 notifies the timings 105_1 to 105_3 for starting generation of SFN1 to SFN3 respectively to the femto base stations 10_1 to 10_3 (Steps S23_1 to S23_3). Further, the maintenance device 2 notifies the cell configuration list 100 to the RAN-GW 30 (Step S24).

The cell configuration list storing unit 32 in the RAN-GW 30 stores the notified cell configuration list 100.

On the other hand, each of the femto base stations 10_1 to 10_3 starts generation of SFN at the notified timing 105 and adds the SFN to the broadcast information 101 to be wirelessly transmitted as with each of the above-mentioned Steps S4_1 to S4_3. Thus, SFN phase differences registered on the cell configuration list 100 are caused between the timings for starting generation of SFN1 to SFN3, so that there are established relations of the SFN1="X", the SFN2="X+10" and the SFN3="X+20" at a given time.

Assume that the mobile station 20 is located within the femto cell formed by the femto base station 10_1. In this case, the mobile station 20 receives the broadcast information 101_1 transmitted from the femto base station 10_1 as with the above-mentioned Step S5, thereby wirelessly connecting to the femto base station 10_1. Thus, the femto base station 10_1 and the mobile station 20 are in communication with each other as with the above-mentioned Step S6.

After that, when the mobile station 20 moves to approach the femto base station 10_2, the mobile station 20 detects the presence of the femto base station 10_2 as a result of neighboring cell search and receives the broadcast information 101_2 as with the above-mentioned Step S7. At this time, the mobile station 20 measures the CFN-SFN difference 103 between the CFN received from the femto base station 10_1 and the SFN2 added to the broadcast information 101_2 as with the above-mentioned Step S8. Then, the mobile station 20 notifies the measured CFN-SFN difference 103 to the femto base station 10_1 as with the above-mentioned Step S9.

The femto base station 10_1 calculates the SFN difference between the SFN2 and the SFN1 in accordance with the above-mentioned expression (1). At this time, the femto base station 10_1 transmits to the RAN-GW 30 the calculated SFN difference together with a handover request whose destination is indefinite.

The handover target specifying unit 33 in the RAN-GW 30 refers to the cell configuration lists 100, and thus specifies as the handover target of the mobile station 20 the femto base station 10_2 starting generation of SFN with the SFN phase difference equivalent to the received SFN difference with respect to the femto base station 10_1 (Step S26). At this time, the handover target specifying unit 33 transfers the handover request from the femto base station 10_1 to the femto base station 10_2 through the communication relaying unit 31 (Step S27).

Further, the femto base station 10_1 transmits the handover request to the mobile station 20 as with the above-mentioned Step S12. Thus, the femto base station 10_2 and the mobile station 20 are in communication with each other as with the above-mentioned Step S13.

Thus, in this exemplary embodiment, it is possible to uniquely specify the handover target cell even when there exist a plurality of neighboring femto cells using the same PSC. Note that the RAN-GW 30 can communicate with a macro base station through the core network and an RNC (Radio Network Controller), and can control a timing for starting generation of SFN in the macro base station. Therefore, the RAN-GW 30 can also uniquely specify the femto cell as the handover target upon a handover from a macro cell to a femto cell.

Note that the RAN-GW 30 may store a cell configuration list 100a shown in FIG. 12 as a substitute for the cell configuration list 100. On the cell configuration list 100a, the source base station of the SFN difference, neighboring base stations adjacent to the source base station, and relative SFN phase differences on the basis of the source base station from the neighboring base stations are registered in association with each other. In this case, the RAN-GW 30 does not need to consider the polarity of the SFN difference received from each of the femto base stations 10_1 to 10_3 when referring to the cell configuration list 100a. Therefore, the processing load on the RAN-GW 30 can be reduced. Note that the cell configuration list 100a may be notified from the maintenance device 2, or the RAN-GW 30 may autonomously make it from the cell configuration list 100.

[Fourth Exemplary Embodiment]

Figure 13:
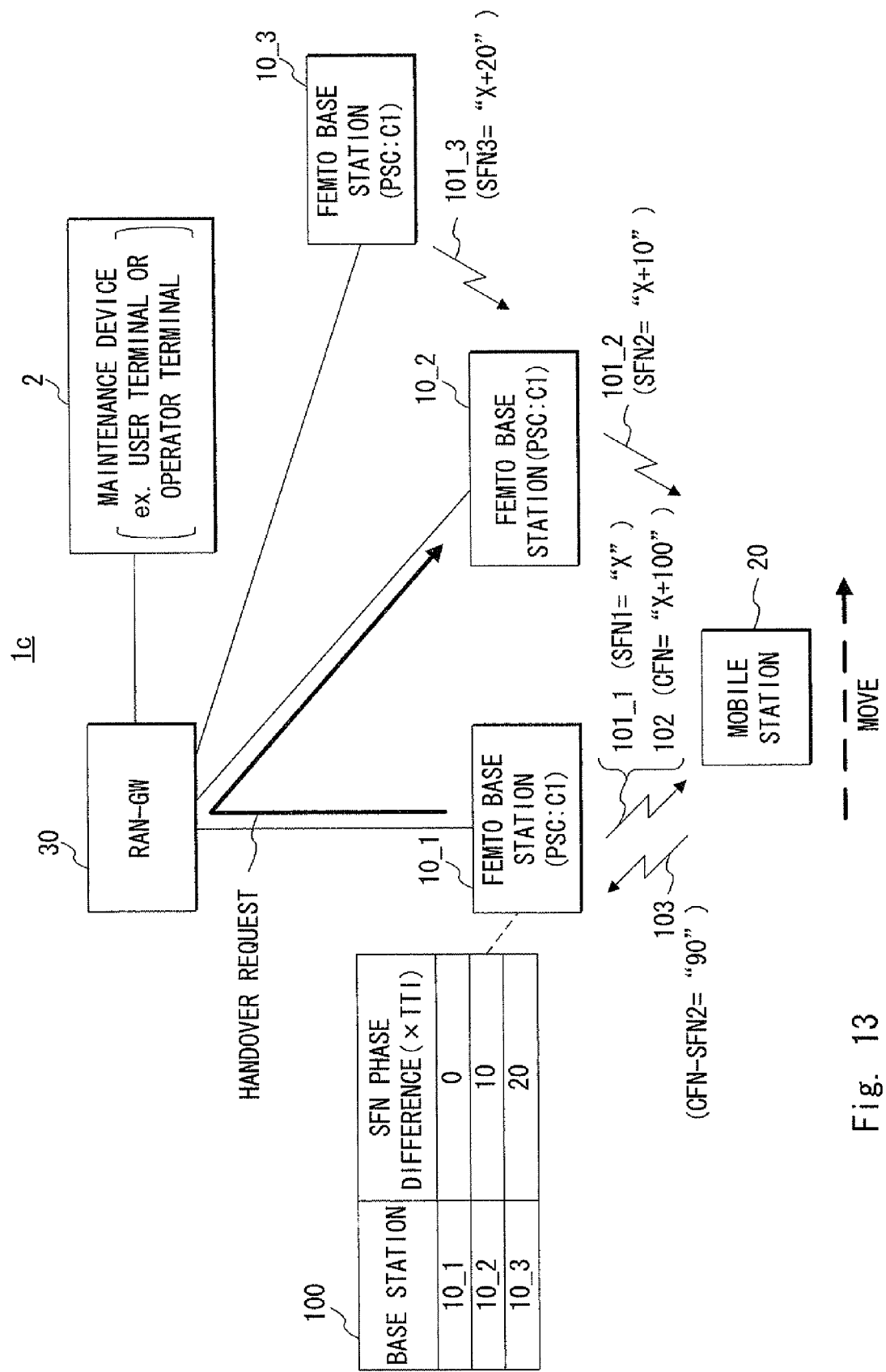
FIG. 13 is a block diagram showing an example of a structure of a mobile communication system according to a fourth exemplary embodiment of the present invention.

As shown in FIG. 13, a mobile communication system 1c according to this exemplary embodiment is different from the above-mentioned second exemplary embodiment (the mobile communication system 1a shown in FIG. 7) in that the maintenance device 2 is connected only to the RAN-GW 30. Note that the maintenance device 2 may be a user terminal, or an operator terminal used by the telecommunication carrier.

Figure 14:
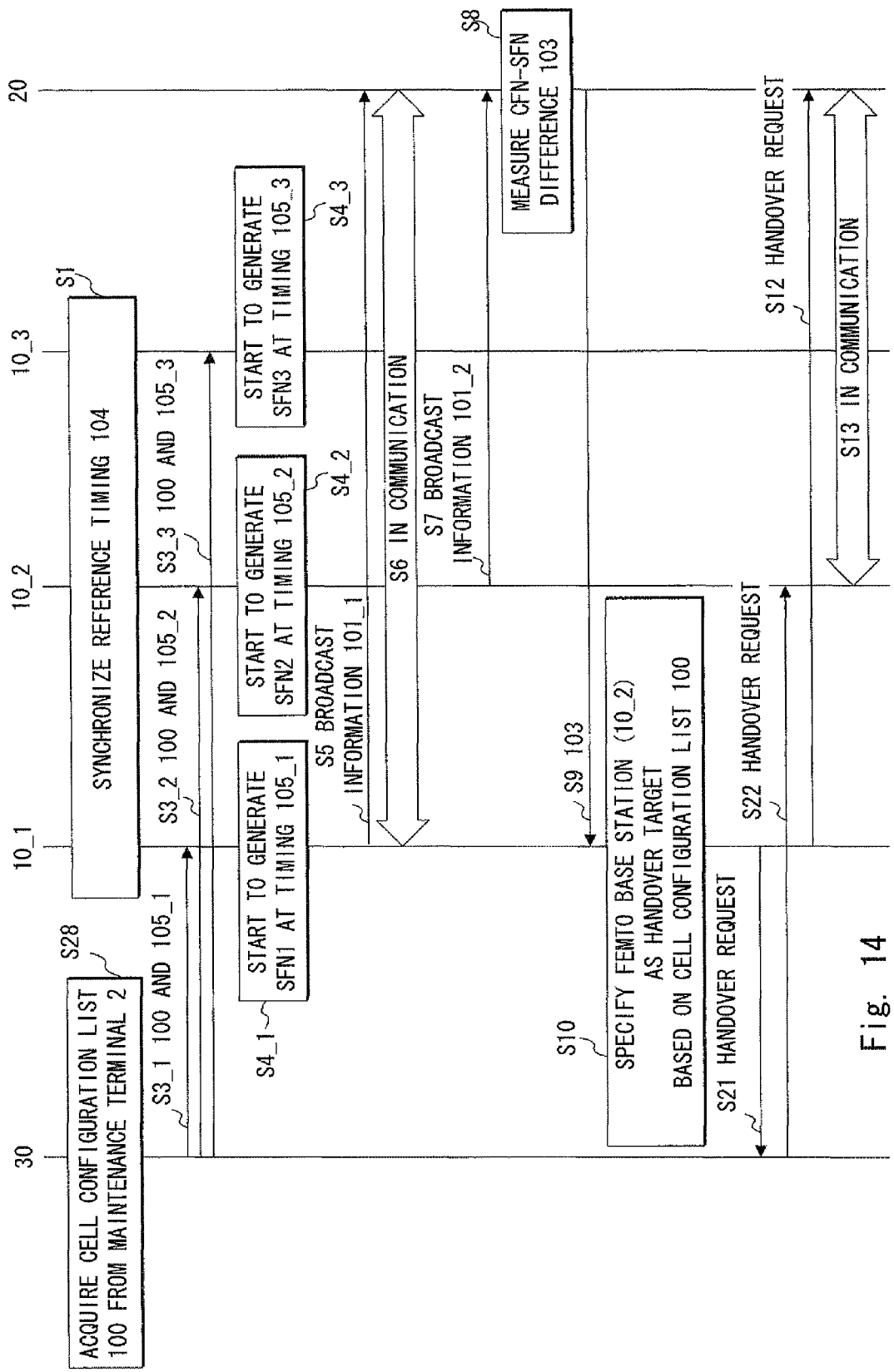
FIG. 14 is a sequence chart showing an example of an operation of the mobile communication system according to the fourth exemplary embodiment of the present invention.
Figure 15:
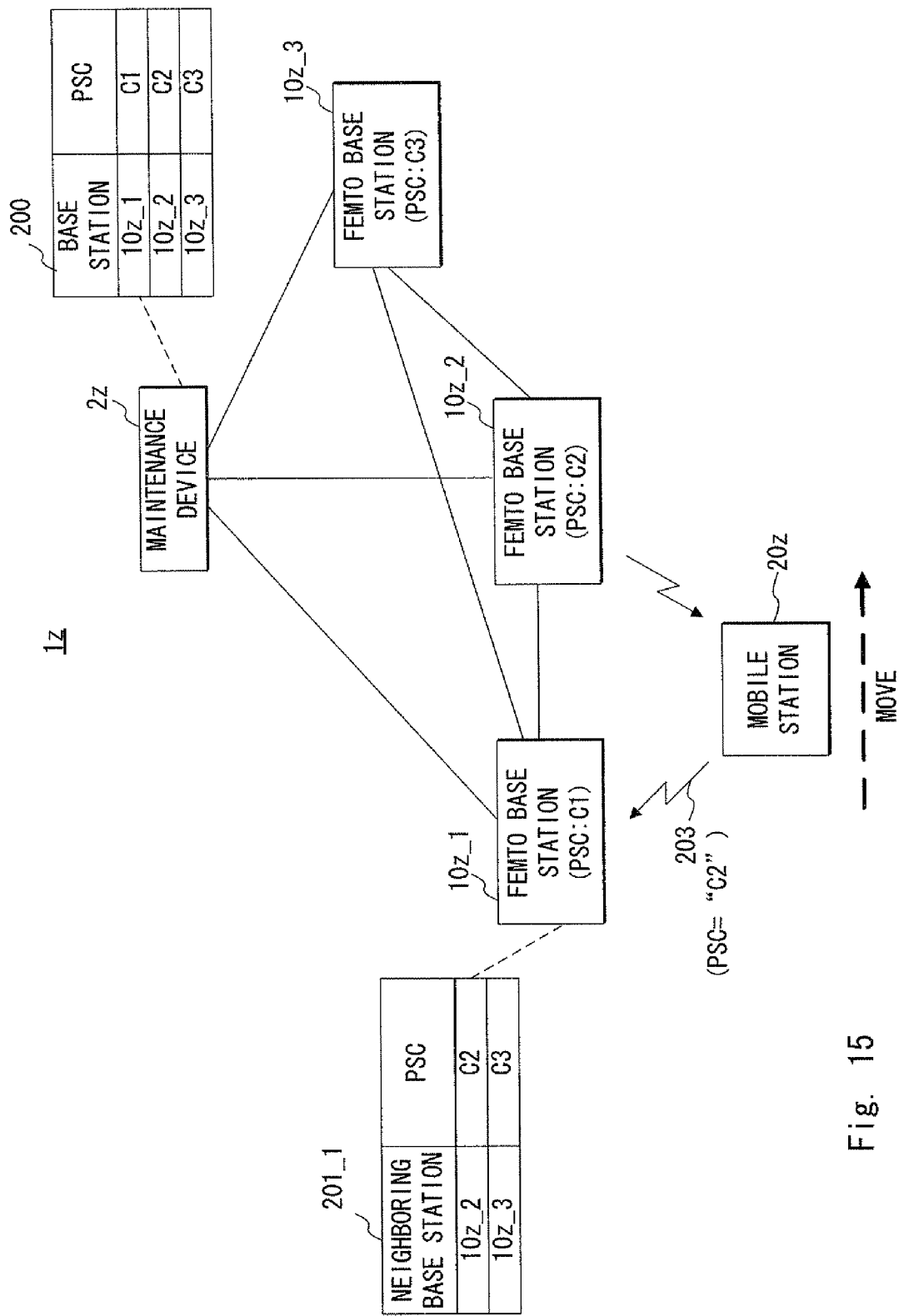
FIG. 15 is a block diagram showing an example of a structure of a typical mobile communication system.
Figure 16:
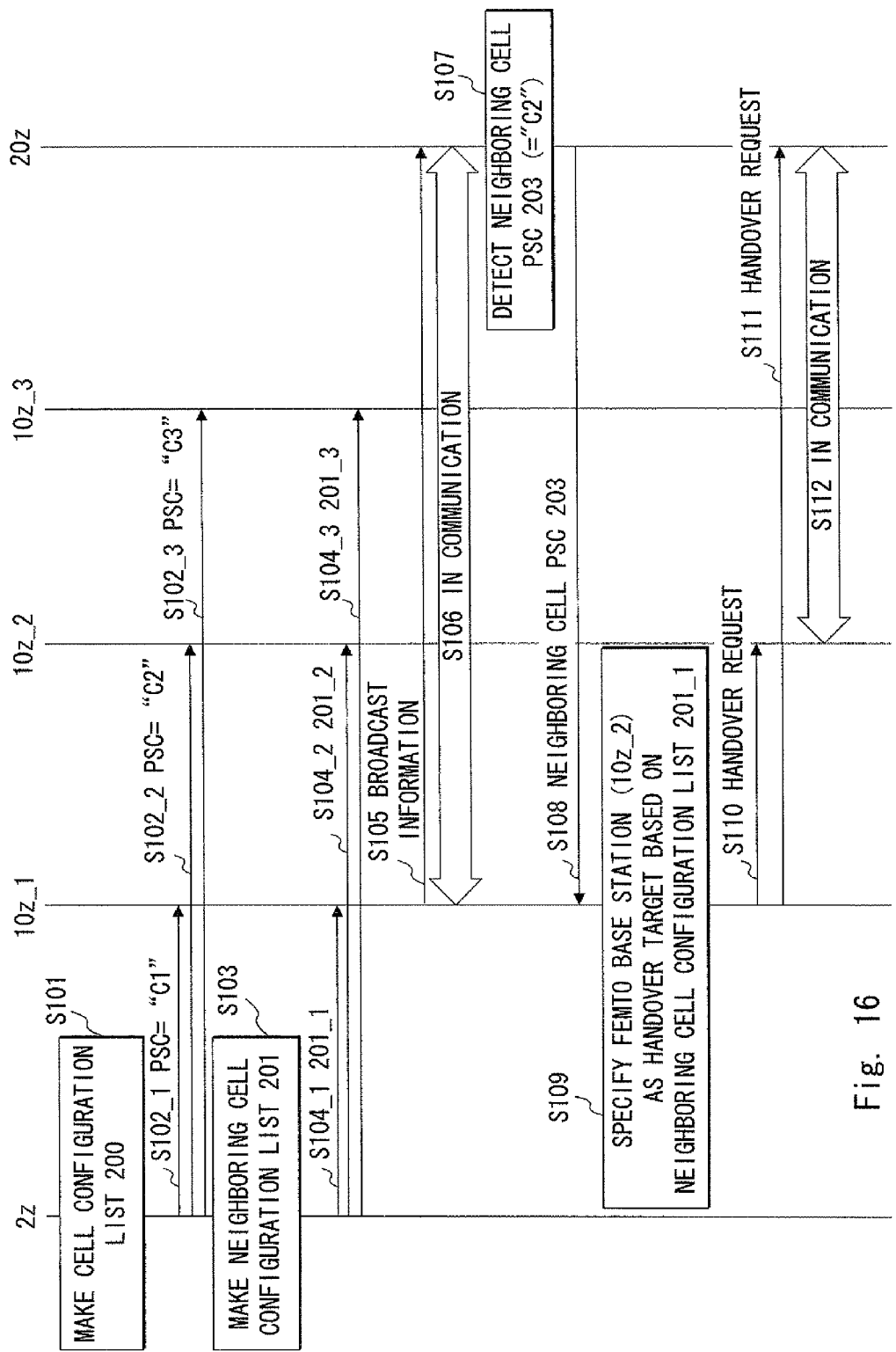
FIG. 16 is a sequence chart showing an example of an operation of the typical mobile communication system.

In the operation, as shown in FIG. 14, the RAN-GW 30 acquires the cell configuration list 100 from the maintenance device 2 (Step S28). Then, the RAN-GW 30 performs the above-mentioned Steps S3_1 to S3_3 shown in FIG. 3 on behalf of the maintenance device 2, thereby notifying the femto base stations 10_1 to 10_3 of the timings 105_1 to 105_3 for starting generation of SFN1 to SFN3 together with the cell configuration lists 100.

On the other hand, the above-mentioned Steps S1, S4_1 to S4_3 and S5 to S10 shown in FIG. 3 are performed in cooperation of the femto base stations 10_1 to 10_3 and the mobile station 20.

Figure 8:
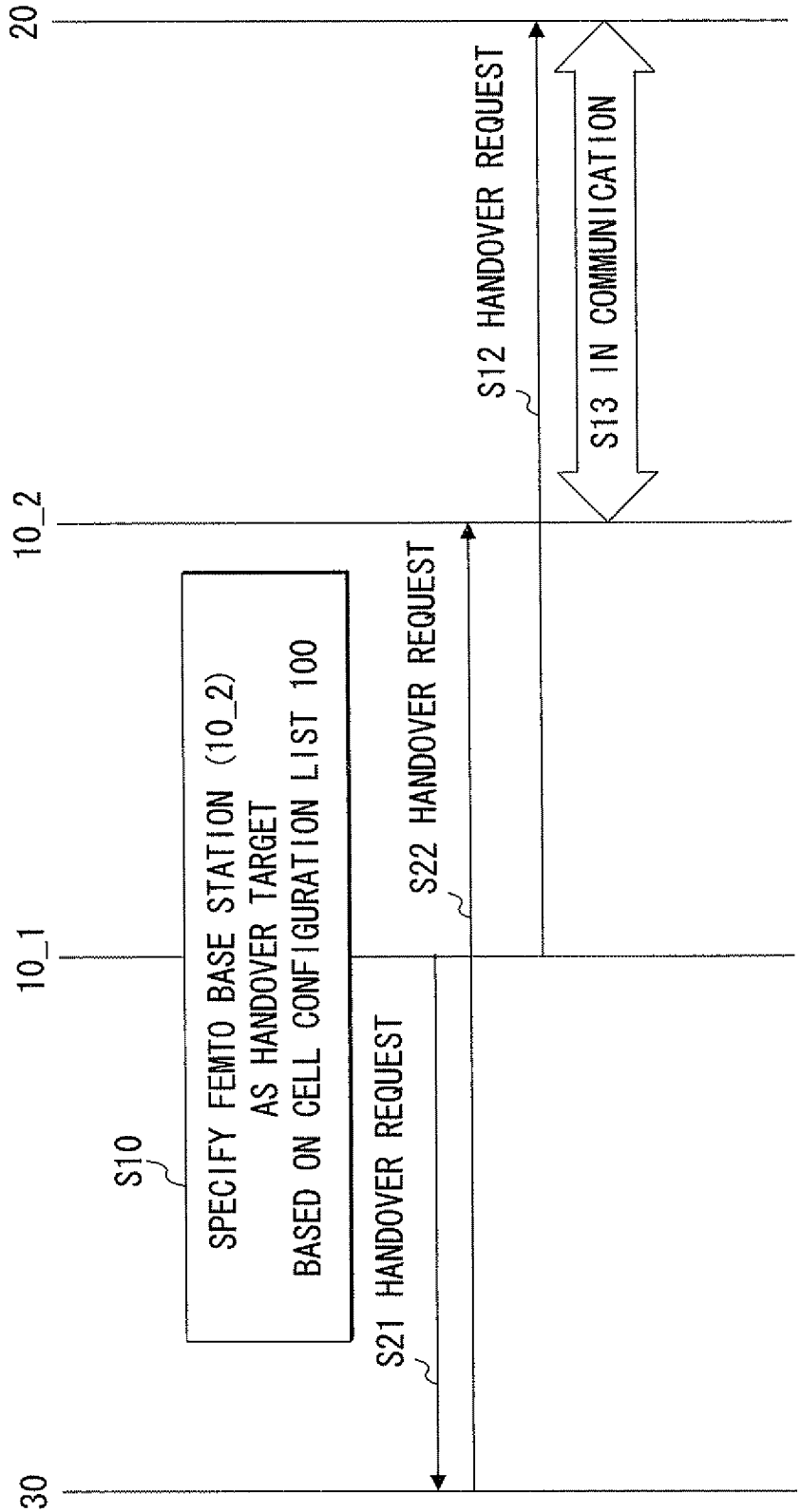
FIG. 8 is a sequence chart showing an example of an operation of the mobile communication system according to the second exemplary embodiment of the present invention.

Taking a handover from the femto base station 10_1 to the femto base station 10_2 as an example, the femto base station 10_1 performs the above-mentioned Step S21 shown in FIG. 8 after the above-mentioned Step S10, thereby transmitting to the RAN-GW 30 a handover request addressed to the femto base station 10_2. The RAN-GW 30 performs the above-mentioned Step S22, thereby transferring the received handover request to the femto base station 10_2.

In parallel with that, the femto base station 10_1 performs the above-mentioned Step S12, thereby requesting the mobile station 20 to perform a handover. Thus, the femto base station 10_2 and the mobile station 20 are in communication with each other as with the above-mentioned Step S13.

In the case of using the user terminal as the maintenance device 2, a user can operate the cell configuration list 100 from a remote location differing from locations where the femto base stations 10_1 to 10_3 are placed. Therefore, it is possible to enhance the convenience upon maintaining the femto base stations 10_1 to 10_3. On the other hand, in the case of using the operator terminal as the maintenance device 2, the telecommunication carrier can manage all of femto base stations connected under the RAN-GW 30 in an integrated fashion without the maintenance by the user.

Further, although the illustration is omitted, the maintenance device 2 may be connected only to the RAN-GW 30 in the above-mentioned third exemplary embodiment (the mobile communication system 1b). In this case, the same advantageous effects with this exemplary embodiment can also be achieved.

Note that the present invention is not limited to the above-described exemplary embodiments, and it will be understood by those of ordinary skill in the art that various changes in form and details may be made therein without departing from the spirit and scope of the present invention as defined by the claims. For example, each processing of the femto base station and the RAN-GW described in the above-described exemplary embodiments can be provided as a program to be executed by a computer. In this case, the program can be stored and provided to a computer using any type of non-transitory computer readable media. Non-transitory computer readable media include any type of tangible storage media. Examples of non-transitory computer readable media include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable media. Examples of transitory computer readable media include electric signals, optical signals, and electromagnetic waves. Transitory computer readable media can provide the program to a computer via a wired communication line such as electric wires and optical fibers or a wireless communication line.

Industrial Applicability

The present invention is applied to a base station, a gateway, a mobile communication system, and handover target specifying method and program used therefor, and is particularly applied to the purpose of specifying a femto base station serving as a handover target of a mobile station.

REFERENCE SIGNS LIST 1, 1a-1c MOBILE COMMUNICATION SYSTEM
2 MAINTENANCE DEVICE
3 TIMING SERVER
4 GPS SATELLITE
10, 10_1-10_3 FEMTO BASE STATION
11 RADIO I/F
12 LOCAL I/F
13, 32 CELL CONFIGURATION LIST STORING UNIT
14 BROADCAST INFORMATION TRANSMITTING UNIT
15, 33 HANDOVER TARGET SPECIFYING UNIT
16 GPS RECEIVER
20 MOBILE STATION
30 RAN-GW
31 COMMUNICATION RELAYING UNIT
100, 100a CELL CONFIGURATION LIST
101, 101_1-101_3 BROADCAST INFORMATION
102 DATA
103 CFN-SFN DIFFERENCE
104 REFERENCE TIMING
105, 105_1-105_3 TIMING FOR STARTING GENERATION OF SFN
106, 106_1-106_3 RESET SIGNAL

The invention claimed is:

1. A base station comprising:
a storing unit that stores phase differences between one timing for said base station itself to start generation of SFN (System Frame Number) and timings for a plurality of neighboring base stations to respectively start generation of SFN, the phase differences differing from each other;
a transmitting unit that adds SFN, the generation of which is started at said one timing, to broadcast information and wirelessly transmits the broadcast information; and
a specifying unit that specifies, as a handover target of a mobile station camping on said base station itself, a neighboring base station starting generation of SFN with a phase difference equivalent to a first difference between one SFN added to the broadcast information and another SFN received at the mobile station with respect to said base station itself,
wherein the transmitting unit is configured to set said one timing in accordance with an instruction from a maintenance device connected in common to the respective base stations.

2. The base station according to claim 1, wherein the specifying unit is configured to:
acquire from the mobile station a second difference between CFN (Connection Frame Number) added by said base station itself upon wirelessly transmitting data and said another SFN; and
calculate the first difference by use of the second difference, the CFN, and said one SFN.

3. The base station according to claim 1, wherein the specifying unit is configured to acquire from the mobile station the first difference.

4. The base station according to claim 1, wherein the specifying unit is configured to cause a gateway that can communicate with each of the base stations to relay a handover request to the base station specified as the handover target.

5. The base station according to claim 4, wherein the specifying unit is configured to use as the gateway a gateway that relays communication between each of the base stations and a core network.

6. A gateway comprising:
a relaying unit that relays communication between N units (N is an integer equal to or more than three) of base stations placed adjacent to each other;
a storing unit that stores phase differences between timings for the N units of base stations to respectively start generation of SFN (System Frame Number), the phase differences differing from each other; and
a specifying unit that receives from one base station a difference between SFN added by said one base station to broadcast information and SFN that is received at a mobile station camping on said one base station and added by another base station to broadcast information, and that specifies as a handover target of the mobile station a base station starting generation of SFN with a phase difference equivalent to said difference with respect to said one base station,
wherein the phase differences differing from each other are designated by a maintenance device connected to the gateway itself.

7. The gateway according to claim 6, wherein the relaying unit is configured to transfer a handover request from said one base station to the base station specified as the handover target.

8. The gateway according to claim 6, wherein the relaying unit is configured to further relay communication between each of the base stations and a core network.

9. A mobile communication system comprising:
N units (N is an integer equal to or more than three) of base stations placed adjacent to each other; and
a mobile station that selectively camps on the N units of base stations,
wherein each of the base stations stores phase differences between one timing for each of the base stations to start generation of SFN (System Frame Number) and timings for other base stations to respectively start generation of SFN, the phase differences differing from each other, and adds SFN, the generation of which is started at said one timing, to broadcast information to be wirelessly transmitted, wherein one base station on which the mobile station camps specifies, as a handover target of the mobile station, a base station starting generation of SFN with a phase difference equivalent to a difference between one SFN added to the broadcast information and another SFN received at the mobile station with respect to said one base station itself, wherein each of the base stations sets said one timing in accordance with an instruction from a maintenance device connected in common to the respective base stations.

10. The mobile communication system according to claim 9, further comprising:

a gateway that relays communication between the N units of base stations, wherein said one base station causes the gateway to relay a handover request to the base station specified as the handover target.

11. A mobile communication system comprising:

N units (N is an integer equal to or more than three) of base stations placed adjacent to each other;

a mobile station that selectively camps on the N units of base stations; and a gateway that relays communication between the N units of base stations, wherein the gateway is configured to:

store phase differences between timings for the N units of base stations to respectively start generation of SFN (System Frame Number), the phase differences differing from each other;

receive, from one base station on which the mobile station camps, a difference between SFN added by said one base station to broadcast information and SFN that is received at the mobile station and added by another base station to broadcast information; and specify, as a handover target of the mobile station, a base station starting generation of SFN with a phase difference equivalent to said difference with respect to said one base station, wherein the phase differences differing from each other are designated by a maintenance device connected to the gateway.

12. The mobile communication system according to claim 11, wherein the gateway further relays communication between each of the base stations and a core network.

13. A handover target specifying method used for a base station, the method comprising:

storing phase differences between one timing for the base station to start generation of SFN (System Frame Number) and timings for a plurality of neighboring base stations to respectively start generation of SFN, the phase differences differing from each other;

adding SFN, the generation of which is started at said one timing, to broadcast information to be wirelessly transmitted;

specifying, as a handover target of a mobile station camping on the base station, a neighboring base station starting generation of SFN with a phase difference equivalent to a first difference between one SFN added to the broadcast information and another SFN received at the mobile station with respect to the base station; and setting said one timing in accordance with an instruction from a maintenance device connected in common to the respective base stations.

14. A handover target specifying method used for a gateway, the method comprising:

relaying communication between N units (N is an integer equal to or more than three) of base stations placed adjacent to each other;

storing phase differences between timings for the N units of base stations to respectively start generation of SFN (System Frame Number), the phase differences differing from each other;

receiving from one base station a difference between SFN added by said one base station to broadcast information and SFN that is received at a mobile station camping on said one base station and added by another base station to broadcast information; and specifying, as a handover target of the mobile station, a base station starting generation of SFN with a phase difference equivalent to said difference with respect to said one base station, wherein the phase differences differing from each other are designated by a maintenance device connected to the gateway.

15. A non-transitory computer readable medium storing a handover target specifying program, the program causing a base station to execute:

a process to store phase differences between one timing for the base station to start generation of SFN (System Frame Number) and timings for a plurality of neighboring base stations to respectively start generation of SFN, the phase differences differing from each other;

a process to add SFN, the generation of which is started at said one timing, to broadcast information to be wirelessly transmitted;

a process to specify, as a handover target of a mobile station camping on the base station, a neighboring base station starting generation of SFN with a phase difference equivalent to a first difference between one SFN added to the broadcast information and another SFN received at the mobile station with respect to the base station; and a process to set said one timing in accordance with an instruction from a maintenance device connected in common to the respective base stations.

16. A non-transitory computer readable medium storing a handover target specifying program, the program causing a gateway to execute:

a process to relay communication between N units (N is an integer equal to or more than three) of base stations placed adjacent to each other;

a process to store phase differences between timings for the N units of base stations to respectively start generation of SFN (System Frame Number), the phase differences differing from each other;

a process to receive from one base station a difference between SFN added by said one base station to broadcast information and SFN that is received at a mobile station camping on said one base station and added by another base station to broadcast information; and a process to specify, as a handover target of the mobile station, a base station starting generation of SFN with a phase difference equivalent to said difference with respect to said one base station, wherein the phase differences differing from each other are designated by a maintenance device connected to the gateway.

* * * * *